United States Patent [19]

Kikuchi et al.

[11] Patent Number: 4,550,695

[45] Date of Patent: Nov. 5, 1985

[54] FAN DEVICE FOR INTERNAL COMBUSTION ENGINE

[75] Inventors: Yasuyuki Kikuchi; Eiichi Matsumoto, both of Yokohama; Yoshimasa Tanaka, Ayase, all of Japan

[73] Assignee: Nissan Motor Company, Limited, Japan

[21] Appl. No.: 605,675

[22] Filed: Apr. 27, 1984

[30] Foreign Application Priority Data

Jun. 8, 1983 [JP] Japan .................. 58-102108
Jun. 8, 1983 [JP] Japan .................. 58-102109

[51] Int. Cl.$^4$ ............................................. F01P 5/02
[52] U.S. Cl. ....................... 123/41.12; 192/82 T
[58] Field of Search ............ 123/41.12, 41.49; 192/58 B, 82 T; 188/166, 167; 416/169 A, 32

[56] References Cited

U.S. PATENT DOCUMENTS 2,771,792  11/1956  Whitney ..................... 416/169 A
3,505,982  4/1970   Walter et al. ............... 416/169 A
3,575,527  4/1971   Watanabe et al. ................ 416/32
4,414,925  11/1983  Mellin ......................... 123/41.12
4,459,087  7/1984   Barge .......................... 123/41.49
4,467,747  8/1984   Braatz et al. .................. 123/41.12

FOREIGN PATENT DOCUMENTS 219660   1/1959  Australia ........................... 416/32
2657302  6/1977  Fed. Rep. of Germany ... 123/41.12
774725   5/1957  United Kingdom ............. 123/41.12
2042172  9/1980  United Kingdom ................. 416/32

*Primary Examiner*—E. Rollins Cross
*Attorney, Agent, or Firm*—Lowe, King, Price & Becker

[57] ABSTRACT

A fan device is provided with a brake which uses a temperature responsive coil made of a shape memory alloy. The brake anchors the rotation of a fan blade when the temperature responsive coil assumes an extended shape where it urges a brake element into a brake apply position.

12 Claims, 9 Drawing Figures

FAN DEVICE FOR INTERNAL COMBUSTION ENGINE

BACKGROUND OF THE INVENTION

The present invention relates to a fan device for an internal combustion engine, and more particularly to a temperature controlled fan device with a braking arrangement.

A temperature controlled fan for an internal combustion engine is well known. A publication "AUTOMOTIVE ENGINEERING VOLUME 4 GASOLINE ENGINE" issued in July 1980 shows such a temperature controlled fan on pages 362 and 363 and in FIGS. 11.85 and 11.86. According to the known temperature controlled fan, a torque of a fan driving shaft is transmitted via an oil to a fan. This fan comprises a fluid coupling, a bimetal and a valve so as to control the amount of oil supplied to the fluid coupling, thus controlling fan speed. The bimetal is exposed to air coming from a radiator and closes the valve at low temperatures to reduce the amount of oil supplied to the fluid coupling thereby reducing the transmitting torque and thus causing the fan to rotate at low speeds or idle. At high temperatures, the bimetal opens the valve to increase the amount of oil supplied to the fluid coupling thereby increasing the transmitting torque and thus increasing the fan speed.

In this known temperature controlled fan device, the fan creeps and does not stop rotating even if the valve is closed by the bimetal because there remains a small amount of torque in the fluid coupling and there exists a friction of a bearing carrying the fan. This leads to a problem that the engine is cooled by cooling air from the fan upon cold start of the engine, leading to a poor warm-up performance. Besides, this worsens the performance of a heater which uses engine coolant.

SUMMARY OF THE INVENTION

According to the present invention, a fan device comprises a driving member, a fan, means for serving as a fluid coupling between the driving member and the fan, and a brake operable responsive to temperature related to an engine to anchor the fan.

An object of the present invention is to improve a fan device in that a fan stops its rotation completely in response to an operation mode of an internal combustion engine where cooling air from the fan is not needed.

DETAILED DESCRIPTION OF THE INVENTION

Figure 1:
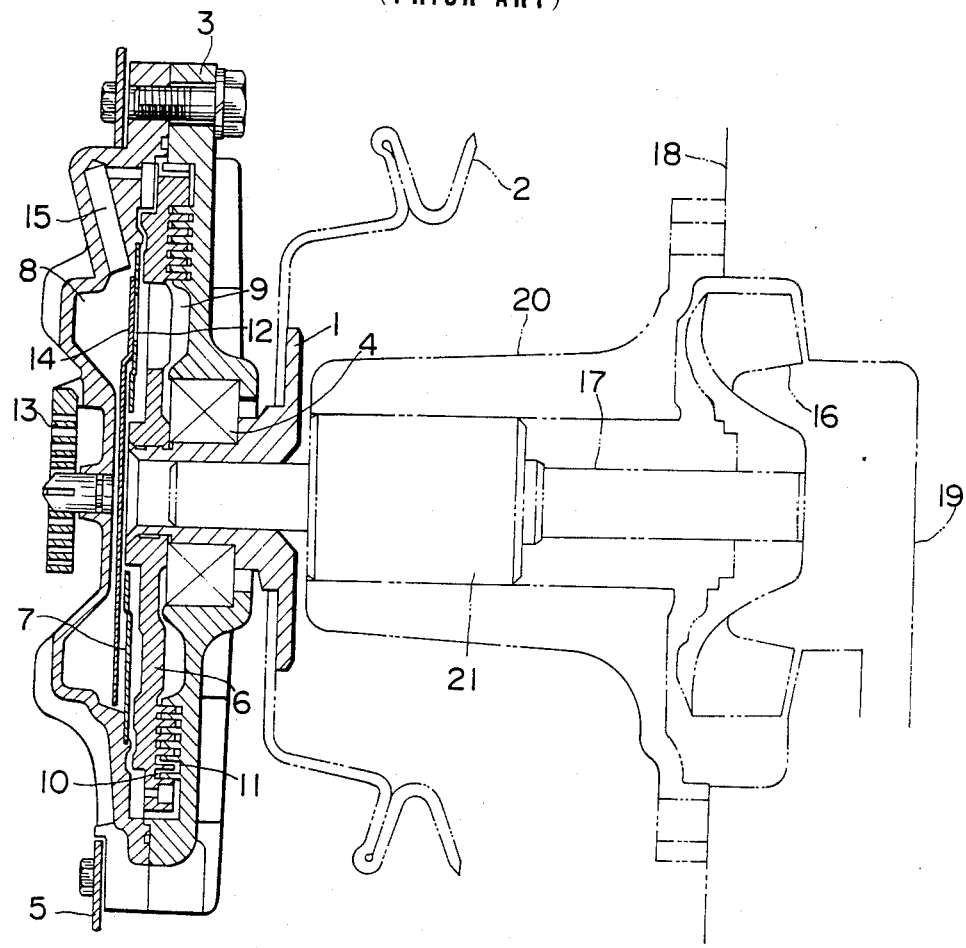
FIG. 1 is a sectional view of the before discussed temperature controlled fan device.

Before entering into the description of the preferred embodiments according to the present invention, the previously discussed known temperature controlled fan device is described again referring to FIG. 1 wherein a fan driving shaft or sleeve 1 has a pulley 2 fixedly attached thereto. A housing 3 is rotatably mounted thereon via a bearing 4. A fan 5 is fixedly secured to the housing 3 on an outer peripheral portion thereof. A rotor 6 is fixedly coupled to the driving shaft 1 for a unitary rotation. Alternatively, the rotor 6 may be integrally formed with the driving shaft 1. A partition plate 7 is disposed in the housing 3 to divide the inside of the housing 3 into a reservoir chamber 8 and a working chamber 9. The rotor 6 is disposed in the working chamber 9 and formed with a plurality of grooves 10 cooperating with a plurality of grooves 11 formed in the housing 3, thereby forming a labyrinth construction which serves as a fluid coupling. The partition plate 7 is formed with a valve hole 12 providing fluid communication between the reservoir chamber 8 and the working chamber 9. A bimetal 13 is operatively coupled to a valve plate 14 which angularly moves to open or close the valve hole 12. The bimetal 13 is exposed to air coming from a radiator, not shown, and moves the valve plate 14 to open or close the valve hole 12 in response to temperature of the coming air from the radiator. With the valve plate 14, the circulation of oil having passed through the labyrinth grooves 10, 11 and returned to the reservoir chamber 8 via a passage 15 toward the working chamber 9 is controlled.

When, in operation, the temperature of the air coming from the radiator is low, the valve plate 14 closes the hole 12 to stop the circulation of the oil. This causes a reduction in amount of oil supplied to the working chamber 9 thereby decreasing transmitting torque from the rotor 6 to the housing 3. As a result the fan 5 rotates at low speeds. On the other hand, when the air temperature rises and is high, the valve plate 14 opens the valve hole 12, thereby allowing the oil to flow into the working chamber 9. Since the sufficient amount of oil is supplied to the labyrinth grooves 10, 11, the transmitting torque is increased, thus allowing the fan 5 to rotate at high speeds.

The driving shaft 1 is driven via the pulley 2 by the engine in a known manner and drives a pump shaft 17 having a water pump impeller 16 because the driving shaft 1 is fixedly coupled to the pump shaft 17. The pump shaft 17 is rotatably supported within a bearing sleeve 20 mounted to the engine main body 18 via a bearing 21.

The coupling structure thus far described is well known and thus further description thereof is omitted.

Figure 2:
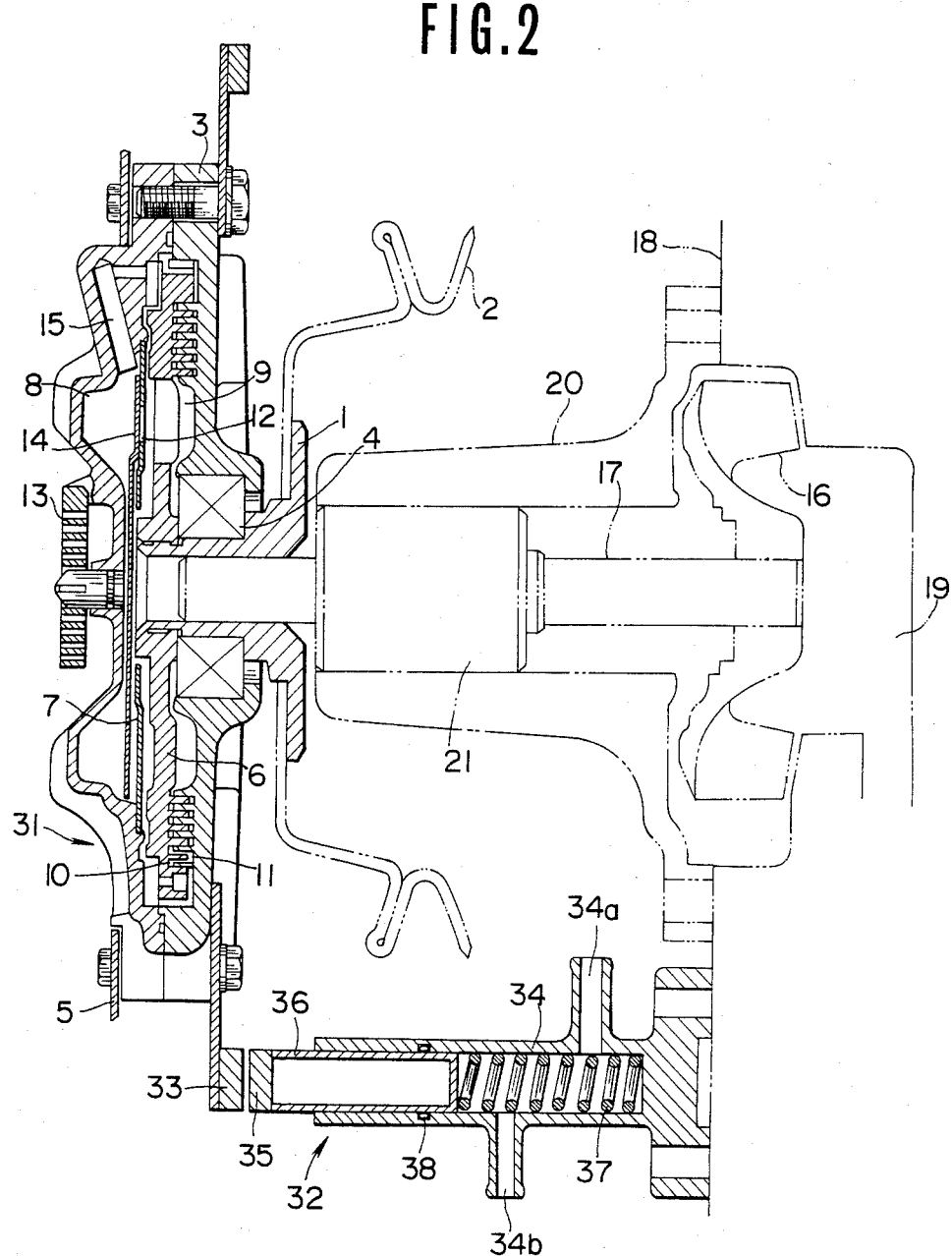
FIG. 2 is a first embodiment of a fan device according to the present invention.

Referring to FIG. 2, the first embodiment is described. In this embodiment, a coupling structure 31 is substantially identical with that shown in FIG. 1. This embodiment is different from the known device shown in FIG. 1 in that it further comprises a brake 32.

The brake 32 comprises an annular brake disc 33 secured to an outer periphery portion of a housing 3 rotatable with a fan 5, a generally cylindrical body 34 formed with a bore having one end closed, a piston 36 with a brake element 35 slidably disposed in the bore of the body 34, and a temperature responsive coil 37 made of a shape memory alloy. The coil 37 has one end engaged with the closed end of the bore and has an opposite end engaged with the adjacent end of the piston 36. With an O-ring 38, the piston 36 sealably engages the bore wall and defines a chamber between the piston 36 and the closed end of the bore. In order to heat the temperature responsive coil 37, the body has an inlet 34a opening into the chamber between the piston 36 and the closed end of the bore and an outlet 34b opening to the same chamber for the purpose of introducing a portion of an engine coolant from the engine. The temperature responsive coil 37 changes its shape from a predetermined extended shape to a predetermined collapsed shape at a predetermined temperature. At temperatures higher than the predetermined temperature, the temperature responsive coil takes the predetermined collapsed shape, while at temperatures lower than the predetermined temperature, it assumes the extended shape. The predetermined temperature at which the coil 37 changes its shape is 60° C. in this embodiment, which temperature value is lower than an operating temperature at which the bimetal 13 starts operating and at which the engine has completed its warm-up operation.

When the temperature of the engine coolant is low such as during start-up of the engine, the coil 37 assumes the extended shape thereby urging the piston 36 to a project position wherein the brake element 35 on the top of the piston 36 is pressed against the brake disc 33. Owing to the friction created by the brake element 35 being pressed against the brake disc 33, the housing 3 is braked and since the torque exerted to the housing 3 is very small as a result of controlling of the working oil, the housing 3 stops its rotation and thus the fan 5 stops its rotation completely.

When the temperature of the engine coolant increases beyond the predetermined temperature at which the coil 37 changes its shape as the warm-up of the engine progresses, the temperature responsive coil 37 assumes the collapsed shape where it urges the piston 36 to a retracted position, thereby disengaging the brake element 35 from the brake disc 33. This releases the housing 3, allowing the fan 5 to rotate due to the small torque exerted to the housing 3 from the driving shaft 1.

Subsequently, when the temperature sensed by the bimetal 13 increases as the temperature of the engine coolant circulating through the radiator, not shown, increases and becomes higher than the predetermined temperature, the bimetal 13 moves the valve plate 7 toward an open position thereof, increasing the transmitting torque, thereby allowing the fan 5 to rotate at high speeds as the driving shaft 1 rotates in the conventional manner.

According to the arrangement above, the rotation of the fan 5 is stopped completely while the engine has not warmed up, which operation mode is detected by the coolant temperature, facilitating warm-up of the engine thereby enhancing the performance of a heat using the engine coolant.

Figure 3:
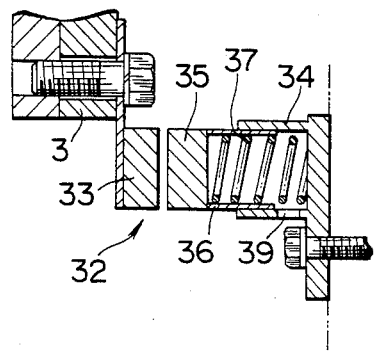
FIG. 3 is a fragmentary sectional view showing a second embodiment according to the present invention.

Referring to FIG. 3, the second embodiment is described. This second embodiment is different from the first embodiment in that as a heating arrangement for a temperature responsive coil 37, an engine ambient air is used rather than the engine coolant. For this purpose, a body 34 is formed with an opening 39.

Figure 4:
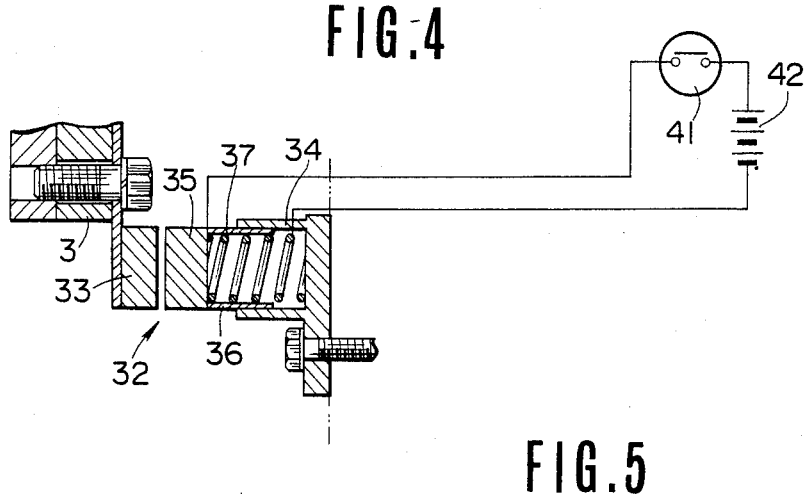
FIG. 4 is a fragmentary sectional view showing a third embodiment according to the present invention.

Referring to FIG. 4, the third embodiment is described. This third embodiment is different from the first embodiment in a heating arrangement wherein a temperature related to the engine is detected at a portion outside of a brake 32. More specifically, a temperature responsive switch 41 which detects an engine coolant temperature or an engine lubricant temperature or an engine ambient temperature is mounted to a suitable portion. The heating arrangement is also provided with a battery 42 which is adapted to supply electric current through a temperature responsive coil 37 of a shape memory alloy when the temperature switch 41 is closed, thereby causing the coil 37 to produce heat.

During warm-up operation of the engine, the temperature switch 41 is turned OFF so that the temperature responsive coil 37 assumes its extended shape, while after the engine has warmed up, the temperature switch 41 is turned ON, causing the coil 37 to produce heat, thereby causing the coil 37 to assume its collapsed shape. In this manner, the coil 37 changes its shape under the control of the temperature switch 41. As an alternative to this embodiment, it is possible to use a temperature responsive coil which is set to take its extended shape when the current passes therethrough and its collapsed shape when the current does not pass therethrough in cooperation with a temperature switch which is set to be turned ON when the engine has not warmed up and turned OFF after the warm-up.

Figure 5:
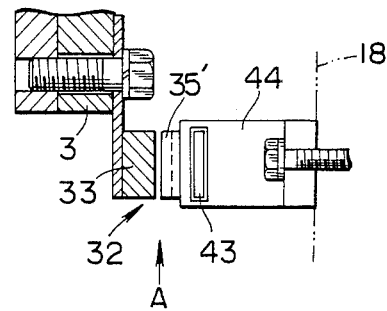
FIG. 5 is a fragmentary sectional view of a fourth embodiment according to the present invention.
Figure 6:
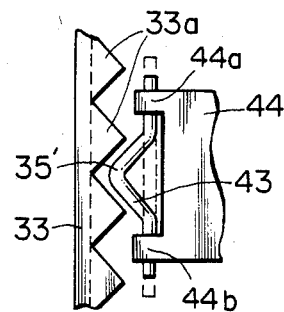
FIG. 6 is a fragmentary view of the embodiment shown in FIG. 5 as viewed therein in a direction indicated by an arrow A.

Referring to FIGS. 5 and 6, the fourth embodiment is decribed. This embodiment is different from the first embodiment in that an annular brake disc 33 has rack teeth 33a as shown in FIG. 6 and a strip 43 made of a shape memory alloy is used. A holder 44 securely mounted to the engine main body 18 is formed with a pair of ears 44a and 44b having formed therethrough openings, respectively. The strip 43 has one end slidably inserted into the opening of the ear 44a and an opposite end slidably inserted into the opening of the ear 44b. The strip 43 is set to take a triangular-like protruded shape as shown by the solid line in FIG. 6 at temperatures lower than a predetermined temperature and takes a flat shape as indicated by the broken lines in FIG. 6 at temperatures higher than the predetermined temperature. Thus, at temperatures lower than the predetermined temperature, the strip 43 takes the protruded shape to engage the rack teeth 33a of the brake disc 33 thereby securely preventing the rotation of the brake disc 33.

Figure 7:
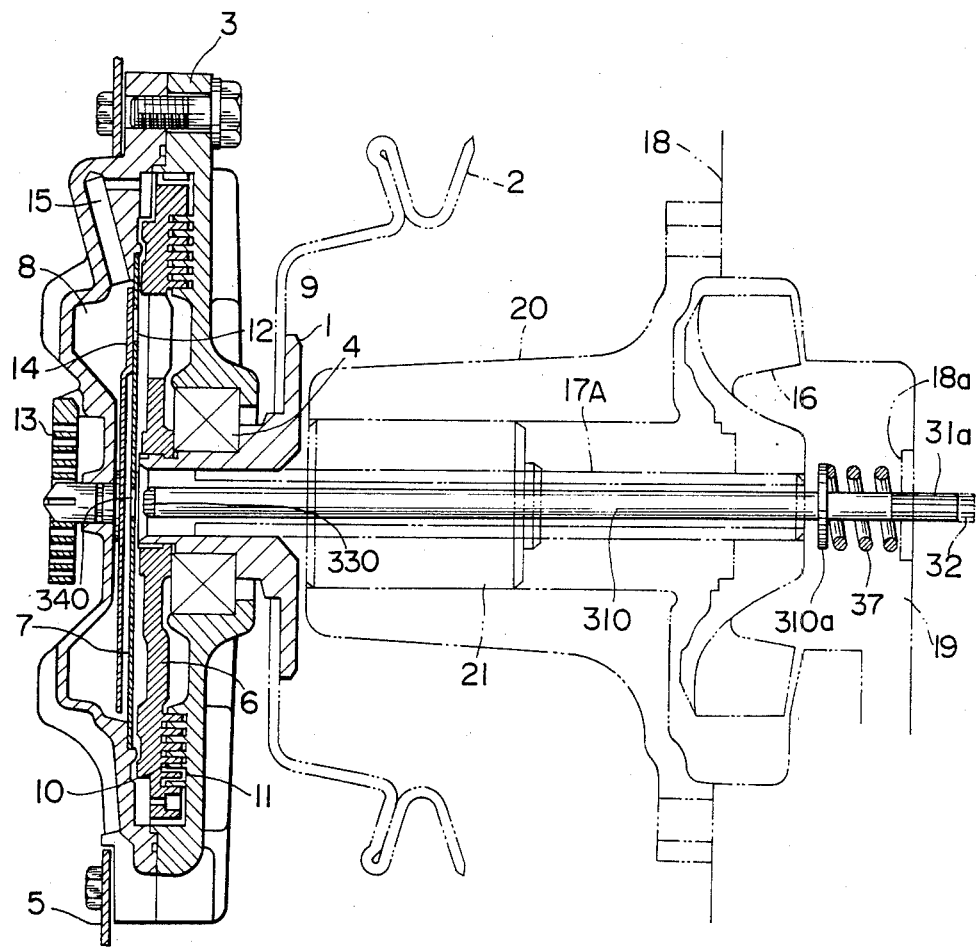
FIG. 7 is a view similar to FIG. 2 showing a fifth embodiment according to the present invention.

Referring to FIG. 7, the fifth embodiment is described. This embodiment is different from the first embodiment in a brake arrangement wherein a pump shaft 17A is hollow to allow a brake shaft 310 to slidably extend therethrough. The brake shaft 310 has one end projected from a water pump impeller 16 and formed with a splined portion 31a splined to a splined bore 32 formed in the engine main body 18 so that it is nonrotatable with the engine main body 18 but axially movable relative to same. The other end portion of the brake shaft 310 which projects into the inside of a housing 3 is formed with an engaging portion 330 in the form of a splined portion which is adapted to engage a splined opening 340 formed through a partition plate 7 which divides the inside of the housing 3 into a reservoir chamber 8 and a working chamber 9. A temperature responsive coil 37 has one end engaged with a base 18a secured to the engine main body 18 and an opposite end engaged with a flange portion 310b. This temperature responsive coil 37 is exposed to detect engine coolant temperature within a water pump 19 and is formed of a shape memory alloy which is set to take a collapsed shape at temperatures higher than a predetermined temperature but takes an extended shape at temperatures lower than the predetermined temperature. At temperatures lower than the predetermined temperature, the coil 37 assumes the extended shape to urge the brake shaft 310 to project into the splined opening 340 of the partition plate 7 thereby stopping the rotation of the housing 3. As a result, a fan 5 stops its rotation.

As the engine warm-up progresses and the temperature increases beyond the predetermined temperature, the coil 35 collapses thereby disengaging the engaging portion 330 of the brake shaft 310 from the splined opening 340 of the partition plate 7. As a result, the housing 3 and fan 5 are allowed to rotate. The temperature responsive member for controlling the movement of the brake shaft 310 may be constructed of a wax pellet of a bimetal.

Figure 8:
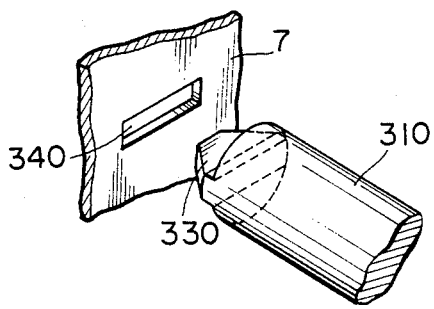
FIG. 8 is a fragmentary perspective view illustrating a sixth embodiment according to the present invention.
Figure 9:
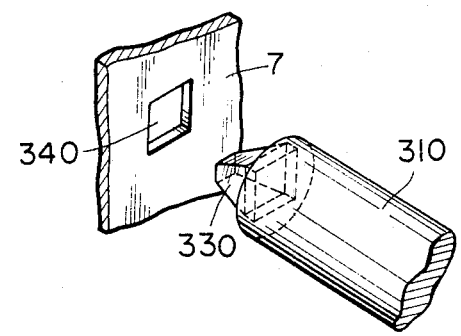
FIG. 9 is a view similar to FIG. 8 illustrating a seventh embodiment according to the present invention.

The engaging portion 330 on the brake shaft 310 and its cooperating engaging opening 340 formed through the partition plate 7 may take different shapes as shown in FIGS. 8 and 9. In FIG. 8, the engaging portion 330 and opening 340 are generally rectangular, while in FIG. 9 they are generally square shaped.

What is claimed is:

1. A fan device for an internal combustion engine, comprising:
   a driving member;
   a fan;
   means for providing a fluid coupling between said driving member and said fan; and
   brake means for preventing rotation of said fan at a predetermined temperature indicative of engine temperature, said brake means including a temperature responsive portion variable in shape in response to changes in engine temperature, said portion having a first shape preventing fan rotation at said predetermined temperature.

2. A fan device as claimed in claim 1, wherein said brake means includes a brake element and said temperature responsive portion is moveable between said first shape and a second shape in response to temperature, said brake element assuming a brake release position when said temperature responsive portion assumes said second shape and a brake apply position when said temperature responsive portion assumes said first shape.

3. A fan device as claimed in claim 2, wherein said brake element is a separated piece from said temperature responsive portion, said temperature responsive portion being made of a shape memory alloy which takes said first shape when the temperature is lower than a predetermined value.

4. A fan device as claimed in claim 2, wherein said brake element and said temperature responsive portion are formed from a single piece made of a shape memory alloy which takes said first shape when the temperature is lower than a predetermined value.

5. A fan device as claimed in claim 1, wherein said brake includes an annular disc rotatable with said fan, a body stationary relative to the internal combustion engine and formed with a bore having a closed end, a piston slidably disposed in said bore, wherein said temperature responsive portion includes a coil disposed in said bore between said piston and said closed end of said bore, a brake element secured to said piston, said coil being made of a shape memory alloy and taking a predetermined extended shape in response to temperature thereof to urge said piston toward a brake position thereof wherein said brake element engages with said annular disc.

6. A fan device as claimed in claim 5, wherein said piston sealably engages said body to define a chamber in said bore between said piston and said closed end of said bore, said coil being disposed in said chamber, and said body has an inlet opening into said chamber and an outlet opening into said chamber, said inlet communicating with an engine cooling system to receive engine coolant to define heating means including said chamber, said inlet, said outlet and the engine cooling system for transmitting engine temperature to said coil.

7. A fan device as claimed in claim 5, wherein said piston defines in said bore a chamber between said piston and said closed end of said bore, said coil being disposed in said chamber, and said body has an aperture opening into said chamber to admit ambient air around the internal combustion engine into said chamber.

8. A fan device as claimed in claim 5, further including an electric circuit connected to said coil for supplying electric current thereto, said electric circuit including a temperature responsive switch responsive to temperature of one of an engine coolant, an engine lubricant oil and an engine ambient temperature.

9. A fan device as claimed in claim 5, wherein said brake includes an annular disc rotatable with said fan and formed with rack teeth, a holder stationary relative to the internal combustion engine and formed with a pair of ears spaced from each other and formed with openings, respectively, and a strip made of a shape memory alloy, said strip having one end slidably inserted into said opening of one of said ears and an opposite end slidably inserted into said opening of the other of said ears, said strip taking a predetermined protruded shape in response to temperature thereof to engage said rack teeth and prevent fan rotation.

10. A fan device as claimed in claim 9, wherein said strip is exposed to ambient temperature around the internal combustion engine.

11. A fan device as claimed in claim 1, wherein said brake means includes a member rotatable with said fan, and a brake element having a shaft nonrotatably mounted to the internal combustion engine main body and slidably disposed in a driving shaft between a brake apply position wherein said shaft is disengaged from said member and a brake release position wherein said shaft is engaged with said member, and wherein said temperature responsive portion includes a temperature responsive element being shiftable in response to temperature thereof between a second shape and said first shape wherein said temperature responsive element urges said shaft toward said brake apply position thereof.

12. A fan device as claimed in claim 11, wherein said member is formed with an aperture and said shaft has an end designed to engage in said aperture and an opposite end splined to a splined bore formed in the internal combustion engine main body.

* * * * *